United States Patent [19]

Sinclair

[11] Patent Number: 4,502,152

[45] Date of Patent: Feb. 26, 1985

[54] LOW CURRENT LINEAR/HIGH CURRENT CHOPPER VOLTAGE REGULATOR

[75] Inventor: Walter Sinclair, Westoning, England

[73] Assignee: Lucas Industries Limited

[21] Appl. No.: 571,133

[22] Filed: Jan. 17, 1984

Related U.S. Application Data

[63] Continuation of Ser. No. 64,643, Aug. 7, 1979, abandoned.

[30] Foreign Application Priority Data

Aug. 16, 1978 [GB] United Kingdom ............... 33540/78

[51] Int. Cl.³ .......................... H04B 1/40; G05F 1/58
[52] U.S. Cl. ..................................... 455/73; 323/268; 323/277; 323/284; 455/127; 455/343
[58] Field of Search ............... 323/265, 268, 269, 271, 323/272, 277, 284; 455/127, 343, 73

[56] References Cited

FOREIGN PATENT DOCUMENTS 1513433  2/1970  Fed. Rep. of Germany ...... 323/268
 325601  2/1972  U.S.S.R. ........................... 323/269

Primary Examiner—William H. Beha, Jr.
Attorney, Agent, or Firm—Stevens, Davis, Miller & Mosher

[57] ABSTRACT

A power supply circuit includes a high current chopper type regulator and a low current linear regulator feeding a common regulated supply rail. The linear regulator regulates to a higher voltage than the chopper regulator, but has a characteristic such that its output voltage falls below that of the chopper regulator when current in excess of a predetermined level is drawn. Thus, at low current levels, the chopper regulator is inactive and the linear regulator supplies a ripple-free output. At high current levels, on the other hand, the chopper regulator becomes effective to provide a stable output voltage.

9 Claims, 2 Drawing Figures

LOW CURRENT LINEAR/HIGH CURRENT CHOPPER VOLTAGE REGULATOR

This application is a continuation of application Ser. No. 64,643, filed Aug. 7, 1979, now abandoned.

This invention relates to power supply circuits for use, for example, in a radio, radar or sonar combined transmitter and receiver.

In such an application the power supply is required to give a ripple free output during reception when the current drawn is low, but is also required to give a relatively high current at a stable voltage during transmission. The construction of a conventional power supply to fulfil both requirements would be extremely expensive and might be excessively large and cumbersome and it is an object of the present invention to provide a simple power supply circuit suitable for such an application.

A power supply circuit in accordance with the invention comprises the combination of a light current liner voltage regulator and a heavy current chopper voltage regulator, feeding a common regulated supply conductor the light current voltage regulator having a current voltage characteristic such that the voltage falls when the current increases above a predetermined level, the two voltage regulators having their outputs connected together and the light current regulator being arranged to regulate its output voltage at a level above that of the chopper regulator providing that the load current is less than the predetermined value.

One example of the invention is shown in the accompanying drawings in which.

Figure 1:
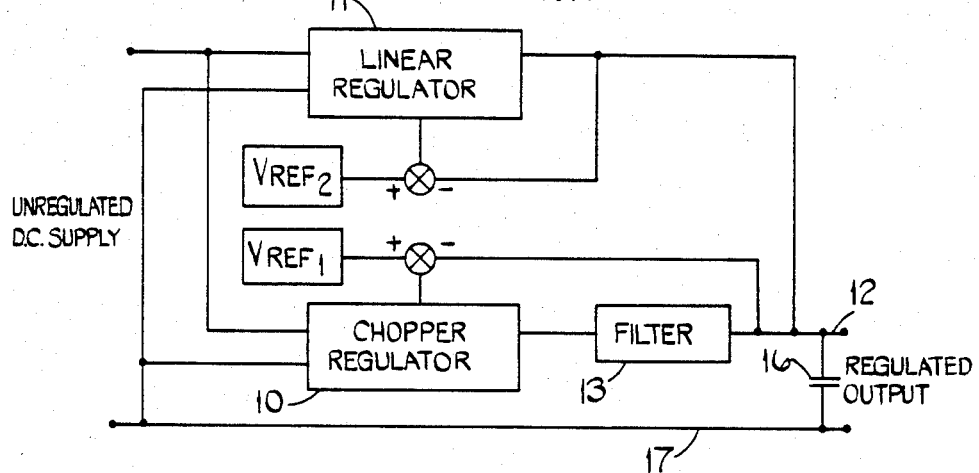
FIG. 1 is a block diagram of the circuit.

Referring firstly to FIG. 1 it will be seen that the power supply circuit shown includes a chopper regulator circuit 10 and the linear regulator circuit 11, both drawing current from the same unregulated d.c. supply and with their outputs connected, to a common output rail 12. A suitable chopper regulator for such use is shown in FIGS. 3 and 8 in the *Switching Regulator Design Guide*, Publication No. U-68, published in 1974 by Unitrode Corporation of 580 Pleasant Street, Watertown, Mass. 02172. The chopper regulator circuit 10 is connected to rail 12 by a filter circuit 13, the rail 12 being connected by a reservoir capacitor 16 to the common ground rail 17. FIG. 1 shows feedback connections from the rail 12 to the two regulator circuits 10, 11 but in fact such feedback may be derived from a point within the apparatus (not shown) to which the circuit shown in FIG. 1 supplies current.

Figure 2:
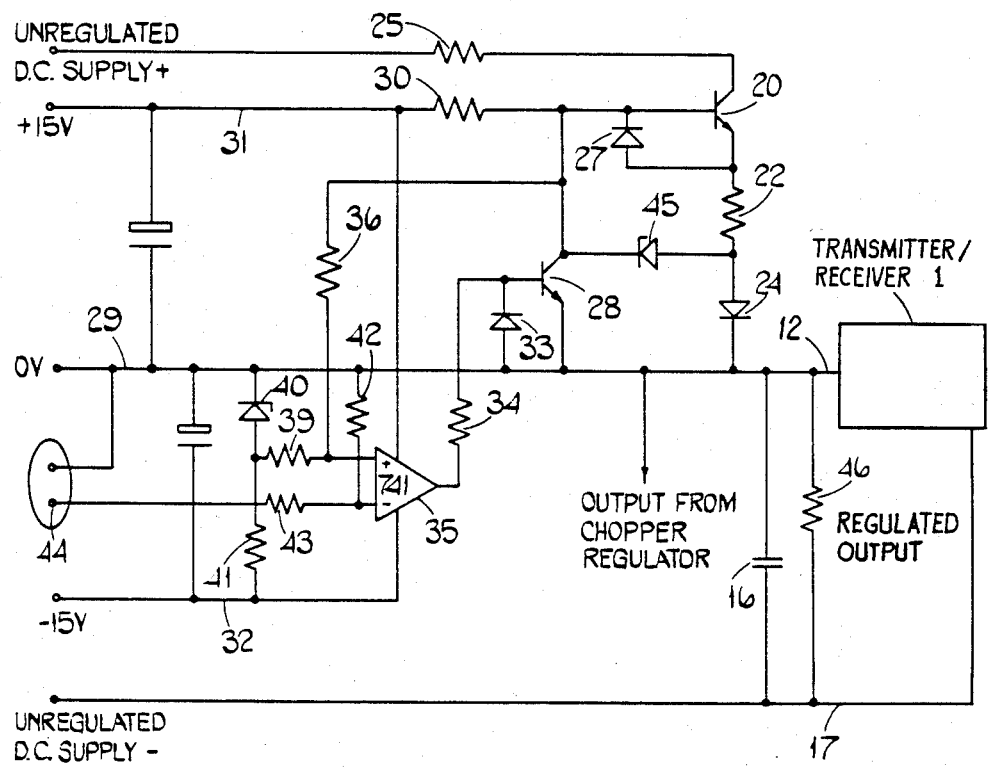
FIG. 2 is an electric circuit diagram of a linear regulator included in the circuit of FIG. 1.

Turning now to FIG. 2 it will be seen that the linear regulator includes an output transistor 20, which has its emitter connected by a resistor 22 to the anode of a diode 24 which has its cathode connected to the rail 12. The collector of the output transistor 20 is connected by a resistor 25, to the positive side of the unregulated d.c. supply. A protective diode 27 is connected between the base and emitter of the transistor 20.

A control transistor 28 has its emitter connected to the 0 volt conductor 29 of a ±15 V dual rail d.c. supply and its collector connected to the base of transistor 20 and by a resistor 30 to the positive rail 31 of the ±15 V supply. The 0 volt conductor 29 is connected to the output rail 12 which connected to transmitter/receiver 1. A further protective diode 33 is connected between the base and emitter of the control transistor 28 and the base of transistor 28 is connected by a resistor 34 to the output terminal of an integrated circuit operational amplifier 35. Local feedback around the amplifier 35 is provided by a resistor 36 connecting the collector of the transistor 28 to the non-inverting input terminal of the amplifier 35.

The non-inverting input terminal of the amplifier 35 is connected by a resistor 39 to the anode of a voltage reference zener diode 40, the cathode of which is connected to the rail 29, and a bias resistor 41 connects the anode of zener diode 40 to the negative rail 32. The inverting input terminal of the amplifier 35 is connected to the rail 29 by a resistor 42 and to a remote voltage sensing point via a resistor 43 and a cable 44.

A zener diode 45 has its anode connected to the anode of diode 24 and its cathode connected to the base of transistor 20.

In operation the voltage at the remote sensing point will be dependent on the voltage on rail 12 with respect to rail 17 so that as the voltage on rail 12 rises (when transistor 20 is on) the voltage at the sensing point becomes more negative. When the voltage at the inverting input terminal falls below the reference voltage determined by the zener diode 40, the output of amplifier 35 tends to rise so as to increase the conduction of transistor 28 and thereby reducing the conduction of transistor 20 so that the voltage on rail 12 is maintained at a steady value. The resistor 36 in conjunction with resistor 39 sets the gain of amplifier 35 and the transistor 28. The zener diode 45 and resistor 22 determine the maximum current which can be delivered to the rail 12 by transistor 20. As a result the load regulation characteristic is such that the output voltage falls if the current demand rises above the predetermined value which is above the receiver operating current but less than the transmitter operating current. A load resistor 46 across the capacitor 16 provides a sink for the leakage current of transistor 20.

The power supply circuit described is intended for use in a radio radar or sonar transceiver. The current drawn during the receive mode is such that output ripple and interference is minimised and good regulation is achieved. The reference voltage used in the chopper regulator 10 is smaller than that used in the linear regulator 11 by more than the amplitude of the ripple at this load current so that the chopper regulator does not come into action. When the transceiver is operated in the transmit mode however, the current drawn from the linear regulator is greater than the predetermined current and causes the voltage on rail 12 to fall so that the chopper regulator comes into effect. The comparatively large ripple generated by the chopper regulator and the voltage transients which occur on rail 12 can be tolerated during transmission, but not during reception.

I claim:

1. A power supply circuit in combination with a transmitter/receiver system, said system having a current drain when operable in a transmit mode and also having a current drain when operable in a receive mode, said power supply circuit comprising:

linear voltage regulator means, connected to said supply voltage and providing a first voltage output, for regulating said voltage output to a first reference voltage, said linear voltage regulator means having a current voltage characteristic such that said output voltage falls below a second reference voltage when current through said linear voltage regulator means increases above a predetermined level, wherein said predetermined level is greater than said current drain of said transmitter/receiver operating in said receive mode and less than the current drain of said transmitter/receiver operating in said transmit mode;

chopper voltage regulator means connected to said supply voltage and providing a second voltage output, for regulating said chopper voltage regulator means output to said second reference voltage, said second voltage is of less absolute magnitude than said first reference voltage; and means for interconnecting said regulator means outputs.

2. A power supply circuit as claimed in claim 1, in which said linear voltage regulator means includes current limiting means for causing said first output voltage to fall when said current through said linear voltage regulator means increases above said predetermined level.

3. A power supply circuit as claimed in claim 2, in which said linear voltage regulator means comprises an output transistor having its collector connected to said supply voltage, and its emitter connected to said linear voltage regulator means output, and means, sensitive to the voltage on said regulator means outputs, for controlling the current supplied to the base of said output transistor, said current limiting means including a resistor which connects the emitter of said output transistor to said interconnecting means and a zener diode connecting the base of said output transistor to said interconnecting means, whereby current supplied under the control of said controlling means to the base of said output transistor is diverted from the output transistor by said zener diode when the current through said resistor exceeds said predetermined level.

4. A power supply circuit in combination with a transmitter/receiver system, said system having a current drain when operable in a transmit mode and also having a current drain when operable in a receive mode, said power supply circuit comprising a d.c. supply, an output rail, means for providing first and second predetermined reference voltages, a light current linear voltage regulator having an input terminal connected to said d.c. supply and an output terminal connected to said output rail, said linear voltage regulator having a current/voltage characteristic such that the output voltage thereof is substantially constant at a first predetermined level when the current in said output rail is less than a predetermined current level, but falls below said first predetermined voltage level when the current in said output rail exceeds said predetermined current level, wherein said predetermined current level is greater than said current drain of said transmitter/receiver operating in said receive mode and less than the current drain of said transmitter/receiver operating in said transmit mode, said linear voltage regulator further including an output voltage signal feedback means for permitting operation as a closed loop linear regulator with respect to said first predetermined reference voltage and a heavy current chopper voltage regulator having an input terminal connected to said d.c. supply, and an output terminal connected to said output rail, said chopper voltage regulator further including an output voltage signal feedback means for permitting operation as a closed loop chopper regulator with respect to said second predetermined reference voltage, said chopper voltage regulator operating only when the voltage on said output rail falls to a second predetermined voltage level lower than said first predetermined level to regulate the voltage on said output rail to said second predetermined voltage level when the current supplied to the output rail exceeds said predetermined current level.

5. A power supply circuit as claimed in claim 4, in which said light current linear voltage regulator includes current limiting means for causing the output voltage of said light current linear voltage regulator to fall when the current increases above said predetermined level.

6. A power supply circuit as claimed in claim 5, in which the light current linear voltage regulator comprises an output transistor having its collector connected to said d.c. supply, and its emitter connected to said output rail, and means, sensitive to the voltage on said output rail, for controlling the current supplied to the base of said output transistor, said current limiting means including a resistor which connects the emitter of said output transistor to said output rail and a zener diode connecting the base of said output transistor to said output rail, whereby current supplied under the control of said controlling means to the base of said output transistor is diverted from the output transistor by said zener diode when the current through said resistor exceeds said predetermined level.

7. A power supply circuit in combination with a transmitter/receiver system, said system having a current drain when operable in a transmit mode and also having a current drain when operable in a receive mode, said power supply circuit comprising:

a d.c. supply;

an output rail;

means for providing first and second predetermined reference voltages;

a light current linear voltage regulator having an input terminal connected to said d.c. supply and an output terminal connected to said output rail, said linear voltage regulator having a current/voltage characteristic such that the output voltage thereof is substantially constant at a first predetermined voltage level when the current in said output rail is less than a predetermined current level, but falls below said first predetermined voltage level when the current in said output rail exceeds said predetermined current level, wherein said predetermined current level is greater than said current drain of said transmitter/receiver operating in said receive mode and less than the current drain of said transmitter/receiver operating in said transmit mode;

said linear voltage regulator further including an output voltage signal feedback means for permitting operation as a closed loop linear regulator with respect to said first predetermined reference voltage; and a heavy current chopper voltage regulator means, having an input terminal connected to said d.c. supply and an output terminal connected to said output rail, for operating only when the voltage on said output rail falls to a second predetermined voltage level lower than said first predetermined level and for regulating the voltage on said output rail to said second predetermined voltage level when the current supplied to the output rail exceeds said predetermined current level, said chopper voltage regulator further including an output voltage signal feedback means for permitting operation as a closed loop chopper regulator with respect to said second predetermined reference voltage.

8. A power supply circuit as claimed in claim 7, in which said light current linear voltage regulator includes current limiting means for causing the output voltage of said light current linear voltage regulator to fall when the current increases above said predetermined level.

9. A power supply circuit as claimed in claim 8, in which said light current linear voltage regulator comprises an output transistor having its collector connected to said d.c. supply, and its emitter connected to said output rail, and means, sensitive to the voltage on said output rail, for controlling the current supplied to the base of said output transistor, said current limiting means including a resistor which connects the emitter of said output transistor to said output rail and a zener diode connecting the base of said output transistor to said output rail, whereby current supplied under the control of said controlling means to the base of said output transistor is diverted from the output transistor by said zener diode when the current through said resistor exceeds said predetermined level.

* * * * *